US012332075B2

(12) United States Patent
Tokunaga et al.

(10) Patent No.: US 12,332,075 B2
(45) Date of Patent: Jun. 17, 2025

(54) TRAVEL ROUTE GENERATION SYSTEM, TRAVEL ROUTE GENERATION PROGRAM, AND TRAVEL ROUTE GENERATION METHOD (71) Applicant: KAWASAKI MOTORS, LTD., Akashi (JP)

(72) Inventors: Hisato Tokunaga, Kobe (JP); Hirotoshi Shimura, Kobe (JP); Hisanosuke Kawada, Kobe (JP); Toshiyuki Tsubone, Kobe (JP); Masanori Kinuhata, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 152 days.

(21) Appl. No.: 17/351,618

(22) Filed: Jun. 18, 2021

(65) Prior Publication Data
US 2022/0034679 A1 Feb. 3, 2022

(30) Foreign Application Priority Data
Jul. 29, 2020 (JP) .................. 2020-127923

(51) Int. Cl.
*G01C 21/36* (2006.01)
*G07C 5/04* (2006.01)
*H04L 67/12* (2022.01)

(52) U.S. Cl.
CPC ........... *G01C 21/3691* (2013.01); *G07C 5/04* (2013.01); *H04L 67/12* (2013.01)

(58) Field of Classification Search
None
See application file for complete search history.

(56) References Cited

U.S. PATENT DOCUMENTS 6,014,081 A * 1/2000 Kojima .................... G07C 5/04
340/576
6,188,957 B1 * 2/2001 Bechtolsheim .. G08G 1/096827
701/1
(Continued)

FOREIGN PATENT DOCUMENTS

EP         1532600       5/2005
JP    2015200511 A      11/2015
(Continued)

*Primary Examiner* — Bhavesh V Amin
(74) *Attorney, Agent, or Firm* — Alleman Hall & Tuttle LLP (57) ABSTRACT A travel route generation system includes: a first collector that collects running location information indicating running locations through which a plurality of vehicles have run; a second collector that collects vehicle-related information related to the plurality of vehicles; a memory that stores the vehicle-related information in association with the running location information; a criteria inputter that receives inputs of screening criteria including a criterion regarding the vehicle-related information; a processor that generates a recommended running route according to the screening criteria and based on the running location information and the vehicle-related information which are stored in the memory; and an outputter that outputs the recommended running route generated by the processor.

15 Claims, 7 Drawing Sheets

(56) References Cited

U.S. PATENT DOCUMENTS

| | | | | |
|---|---|---|---|---|
| 6,254,108 B1* | 7/2001 | Germain | B60G 21/0553 | 280/5.506 |
| 6,276,693 B1* | 8/2001 | Oakley | F16F 9/064 | 280/5.506 |
| 6,805,362 B1* | 10/2004 | Melcher | B60G 17/0165 | 280/86.757 |
| 7,460,936 B2* | 12/2008 | Fulks | B60G 21/007 | 60/600 |
| 7,591,337 B2* | 9/2009 | Suhre | B60G 3/20 | 280/5.509 |
| 7,647,999 B2* | 1/2010 | Geiser | B62K 5/10 | 180/210 |
| 7,802,800 B2* | 9/2010 | Melcher | B62K 5/10 | 180/41 |
| 8,014,914 B2* | 9/2011 | Boss | G06Q 30/018 | 705/317 |
| 8,020,878 B2* | 9/2011 | Hara | B62K 5/10 | 280/5.509 |
| 8,123,240 B2* | 2/2012 | Mercier | B62K 5/10 | 280/5.506 |
| 8,249,775 B2* | 8/2012 | Van Den Brink | B62D 9/02 | 280/5.509 |
| 8,251,375 B2* | 8/2012 | Hara | B62D 9/02 | 280/5.509 |
| 8,416,067 B2* | 4/2013 | Davidson | G07C 5/02 | 340/439 |
| 8,818,700 B2* | 8/2014 | Moulene | B62K 5/01 | 280/5.509 |
| 8,831,833 B2* | 9/2014 | Hayashi | B62D 9/04 | 701/42 |
| 8,880,272 B1* | 11/2014 | Ferguson | B60W 60/001 | 701/26 |
| 8,928,495 B2* | 1/2015 | Hassib | G07C 5/006 | 701/1 |
| 8,952,869 B1* | 2/2015 | Weaver | G06F 3/147 | 381/327 |
| 8,997,911 B2* | 4/2015 | Hayashi | B62K 5/025 | 280/5.509 |
| 9,037,347 B2* | 5/2015 | Hayashi | B62K 5/10 | 313/146 |
| 9,177,476 B2* | 11/2015 | Breed | H04W 4/024 | 701/1 |
| 9,188,985 B1* | 11/2015 | Hobbs | G01C 21/3682 | |
| 9,307,365 B2* | 4/2016 | Sheha | G01C 21/3682 | |
| 9,487,234 B1* | 11/2016 | Matthies | B62K 5/027 | |
| 9,528,850 B1* | 12/2016 | Hobbs | G01C 21/367 | |
| 9,658,620 B1* | 5/2017 | Urmson | B60W 50/14 | |
| 9,672,734 B1* | 6/2017 | Ratnasingam | G08G 1/096741 | |
| 9,704,303 B2* | 7/2017 | Davidson | G06F 17/00 | |
| 9,720,415 B2* | 8/2017 | Levinson | G05D 1/0257 | |
| 9,786,103 B2* | 10/2017 | Menon | G07C 5/008 | |
| 9,903,725 B2* | 2/2018 | Sato | G08G 1/096838 | |
| 9,940,840 B1* | 4/2018 | Schubert | G06Q 30/06 | |
| 10,019,901 B1* | 7/2018 | Fields | G08G 1/096725 | |
| 10,032,320 B1* | 7/2018 | Menon | G06Q 40/08 | |
| 10,042,362 B2* | 8/2018 | Fairfield | G08G 1/096833 | |
| 10,094,675 B2* | 10/2018 | Hajj | G06F 3/04842 | |
| 10,156,848 B1* | 12/2018 | Konrardy | H04L 67/306 | |
| 10,319,159 B1* | 6/2019 | Menon | G07C 5/008 | |
| 10,427,746 B2* | 10/2019 | Yoshino | B62K 5/08 | |
| 10,513,291 B2* | 12/2019 | Kato | B60G 7/001 | |
| 10,639,953 B2* | 5/2020 | Kimura | B60G 21/007 | |
| 10,710,603 B2* | 7/2020 | Beaurepaire | G01C 21/3815 | |
| 10,710,607 B2* | 7/2020 | Peterson | B60W 50/12 | |
| 10,876,848 B2* | 12/2020 | Fischer | G01C 21/3626 | |
| 11,200,359 B2* | 12/2021 | Wyrwas | G06V 10/82 | |
| 11,619,503 B2* | 4/2023 | Ozturk | G07C 5/085 | 701/420 |
| 11,851,113 B2* | 12/2023 | Hon | B62K 11/007 | |
| 2002/0013652 A1* | 1/2002 | Yasui | B60T 8/172 | 701/80 |
| 2002/0075139 A1* | 6/2002 | Yamamoto | B60T 8/885 | 340/436 |
| 2002/0109402 A1* | 8/2002 | Nakamura | B60T 8/17552 | 303/146 |
| 2002/0111752 A1* | 8/2002 | Nakamura | G01N 19/02 | 702/42 |
| 2002/0147532 A1* | 10/2002 | Inagaki | B62D 7/159 | 701/91 |
| 2003/0088344 A1* | 5/2003 | Oda | G05D 1/0274 | 318/587 |
| 2003/0218378 A1* | 11/2003 | Tanaka | B60W 10/14 | 303/146 |
| 2004/0030498 A1* | 2/2004 | Knoop | B62D 6/00 | 340/436 |
| 2005/0012501 A1* | 1/2005 | Isono | B60T 8/172 | 324/300 |
| 2005/0216181 A1* | 9/2005 | Estkowski | G08G 1/166 | 340/995.23 |
| 2006/0015249 A1* | 1/2006 | Gieseke | G08G 1/096872 | 340/995.19 |
| 2006/0180372 A1* | 8/2006 | Mercier | B62K 5/027 | 303/146 |
| 2006/0247852 A1* | 11/2006 | Kortge | G01C 21/3461 | 340/995.19 |
| 2007/0067085 A1* | 3/2007 | Lu | B60W 40/114 | 340/440 |
| 2007/0265746 A1* | 11/2007 | Fulks | B60T 8/1755 | 701/1 |
| 2008/0004794 A1* | 1/2008 | Horvitz | G01C 21/3492 | 701/414 |
| 2008/0097699 A1* | 4/2008 | Ono | B62D 15/0265 | 701/300 |
| 2008/0106142 A1* | 5/2008 | Nishino | B60T 8/4081 | 701/76 |
| 2008/0125958 A1* | 5/2008 | Boss | G06Q 10/047 | 701/123 |
| 2008/0262670 A1* | 10/2008 | McClellan | G01S 5/0027 | 701/31.4 |
| 2008/0278314 A1* | 11/2008 | Miller | G07C 5/008 | 340/323 R |
| 2009/0005965 A1* | 1/2009 | Forstall | G01C 21/3484 | 701/533 |
| 2009/0048775 A1* | 2/2009 | Okude | G01C 21/3446 | 701/533 |
| 2009/0088925 A1* | 4/2009 | Sugawara | B60W 30/12 | 340/436 |
| 2009/0140887 A1* | 6/2009 | Breed | G01C 21/1656 | 701/116 |
| 2009/0169055 A1* | 7/2009 | Ishikawa | G01C 21/3815 | 382/104 |
| 2010/0088021 A1* | 4/2010 | Viner | G06Q 30/02 | 709/201 |
| 2010/0145609 A1* | 6/2010 | Boss | G06Q 30/018 | 701/22 |
| 2010/0198508 A1* | 8/2010 | Tang | G01C 21/3469 | 701/414 |
| 2010/0256852 A1* | 10/2010 | Mudalige | G08G 1/22 | 701/24 |
| 2010/0292916 A1* | 11/2010 | Kurciska | G01C 21/3453 | 701/533 |
| 2011/0022527 A1* | 1/2011 | Onishi | G06Q 30/06 | 705/317 |
| 2011/0029198 A1* | 2/2011 | Mizuta | B60G 17/06 | 701/38 |
| 2012/0053802 A1* | 3/2012 | Tronnberg | B60W 30/18145 | 701/69 |
| 2012/0109484 A1* | 5/2012 | Onoda | B60W 30/18145 | 701/72 |
| 2012/0323690 A1* | 12/2012 | Michael | G01C 21/3605 | 705/14.58 |
| 2013/0018577 A1* | 1/2013 | Gooding | G01C 21/3691 | 701/423 |
| 2013/0046510 A1* | 2/2013 | Bowne | G06Q 10/0639 | 702/187 |
| 2013/0158860 A1* | 6/2013 | Gum | H04W 52/0254 | 701/410 |
| 2013/0166121 A1* | 6/2013 | Takeuchi | B60W 10/08 | 701/1 |

(56) References Cited

U.S. PATENT DOCUMENTS

| | | | |
|---|---|---|---|
| 2013/0193656 A1* | 8/2013 | Itoh | B62K 5/10 280/5.509 |
| 2014/0046585 A1* | 2/2014 | Morris, IV | G06Q 10/047 701/400 |
| 2014/0129302 A1* | 5/2014 | Amin | G06Q 50/40 705/13 |
| 2014/0149145 A1* | 5/2014 | Peng | G06F 3/0346 702/150 |
| 2014/0279707 A1* | 9/2014 | Joshua | G06Q 30/0283 701/1 |
| 2014/0358427 A1* | 12/2014 | Fuhrman | G01C 21/3658 701/488 |
| 2015/0039157 A1* | 2/2015 | Wolfe | G06Q 10/0639 701/2 |
| 2015/0254986 A1* | 9/2015 | Fairfield | G05D 1/81 707/687 |
| 2015/0271290 A1* | 9/2015 | Tao | H04W 4/021 709/217 |
| 2015/0274160 A1* | 10/2015 | Lee | B62D 6/002 180/215 |
| 2015/0278759 A1* | 10/2015 | Harris | G06Q 10/08355 705/338 |
| 2015/0285653 A1* | 10/2015 | Kim | A61B 5/0205 701/423 |
| 2015/0292894 A1* | 10/2015 | Goddard | G01C 21/3453 701/400 |
| 2015/0332518 A1* | 11/2015 | Menon | G07C 5/008 701/1 |
| 2015/0338226 A1* | 11/2015 | Mason | G08G 1/096816 701/408 |
| 2016/0082978 A1* | 3/2016 | Ozaki | G01C 21/34 701/58 |
| 2016/0093211 A1* | 3/2016 | Giesler | G01C 21/3407 701/23 |
| 2016/0189544 A1* | 6/2016 | Ricci | G08G 1/096725 701/117 |
| 2016/0209220 A1* | 7/2016 | Laetz | G06Q 10/02 |
| 2017/0008523 A1* | 1/2017 | Christensen | G05D 1/0061 |
| 2017/0219371 A1* | 8/2017 | Suzuki | G08G 1/0112 |
| 2017/0293950 A1* | 10/2017 | Rathod | G06Q 30/0283 |
| 2017/0332208 A1* | 11/2017 | Cardoso de Moura | H04W 24/08 |
| 2018/0038705 A1 | 2/2018 | Bills et al. | |
| 2018/0053405 A1* | 2/2018 | de Azevedo | H04W 4/40 |
| 2018/0107216 A1* | 4/2018 | Beaurepaire | G06Q 30/0261 |
| 2018/0147908 A1* | 5/2018 | Kameda | B60G 17/0182 |
| 2018/0222276 A1* | 8/2018 | Kimura | B62K 5/10 |
| 2018/0237065 A1* | 8/2018 | Yamamoto | B60G 21/007 |
| 2018/0265156 A1* | 9/2018 | Hara | B60G 17/0163 |
| 2019/0025813 A1* | 1/2019 | Cella | G05B 23/0289 |
| 2019/0286151 A1* | 9/2019 | Palanisamy | G08G 1/096816 |
| 2019/0293437 A1* | 9/2019 | Szubbocsev | G06F 16/29 |
| 2019/0324444 A1* | 10/2019 | Cella | G06N 3/088 |
| 2020/0208998 A1 | 7/2020 | Xiang et al. | |
| 2020/0309544 A1* | 10/2020 | Ozturk | G01C 21/343 |
| 2020/0317216 A1* | 10/2020 | Konrardy | B60W 30/182 |
| 2023/0236023 A1* | 7/2023 | Ozturk | G01C 21/343 701/420 |

FOREIGN PATENT DOCUMENTS

| | | |
|---|---|---|
| JP | 6012280 B2 | 10/2016 |
| JP | 2017138179 A | 8/2017 |
| SE | 1550638 A1 * | 11/2015 |
| SE | 1750773 A1 * | 6/2017 |
| WO | 2018220439 A2 | 12/2018 |

* cited by examiner

TRAVEL ROUTE GENERATION SYSTEM, TRAVEL ROUTE GENERATION PROGRAM, AND TRAVEL ROUTE GENERATION METHOD

CROSS-REFERENCE TO RELATED APPLICATION

This application claims priority to and the benefit of Japanese Patent Application No. 2020-127923, filed on Jul. 29, 2020, the entire disclosure of which is incorporated herein by reference.

BACKGROUND

Technical Field

The present disclosure relates to a travel route generation system, a travel route generation program, and a travel route generation method.

Description of the Related Art

Japanese Patent No. 6012280 discloses a technology for collecting manual evaluations as to roads on which a vehicle such as a motorcycle has actually run during travel (such as touring or drive) and creating a map reflecting the evaluations.

The preferred running route from the departure point to the destination point differs from user to user, and even the same user may prefer different routes depending on the situation.

SUMMARY

A travel route generation system according to an aspect of the present disclosure includes: a first collector that collects running location information indicating running locations through which a plurality of vehicles have run; a second collector that collects vehicle-related information related to the plurality of vehicles; a memory that stores the vehicle-related information in association with the running location information; a criteria inputter that receives inputs of screening criteria including a criterion regarding the vehicle-related information; a processor that generates a recommended running route according to the screening criteria and based on the running location information and the vehicle-related information which are stored in the memory; and an outputter that outputs the recommended running route generated by the processor.

In the above configuration, the recommended running route is generated according to the screening criteria including a criterion regarding the vehicle-related information and based on the relationship between the vehicle-related information collected during past travels of the vehicles and the running locations through which the vehicles ran in the past travels. This can help individual users enjoy traveling in accordance with their preferences which may vary from situation to situation.

A travel route generation program according to an aspect of the present disclosure is configured to cause a computer to: collect running location information indicating running locations through which a plurality of vehicles have run; collect vehicle-related information related to the plurality of vehicles; store the vehicle-related information in association with the running location information; receive inputs of screening criteria including a criterion regarding the vehicle-related information; generate a recommended running route according to the screening criteria and based on the running location information and the vehicle-related information; and output the recommended running route.

The travel route generation program is stored in a computer-readable storage medium. The storage medium is a non-transitory, tangible medium. The storage medium is built in or externally attached to a computer (e.g., a portable information terminal, a personal computer, or a server). The storage medium includes a storage, a ROM, or a RAM and may be, for example, a hard disk, a flash memory, or an optical disk. The program stored in the storage medium may be executed in a computer to which the storage medium is directly connected or a computer to which the storage medium is connected via a network (e.g., the Internet).

A travel route generation method according to an aspect of the present disclosure includes: collecting running location information indicating running locations through which a plurality of vehicles have run; collecting vehicle-related information related to the plurality of vehicles; storing the vehicle-related information in association with the running location information; receiving inputs of screening criteria including a criterion regarding the vehicle-related information; generating a recommended running route according to the screening criteria and based on the running location information and the vehicle-related information; and outputting the recommended running route.

DETAILED DESCRIPTION OF THE EMBODIMENTS

Hereinafter, exemplary embodiments will be described with reference to the drawings.

Figure 1:
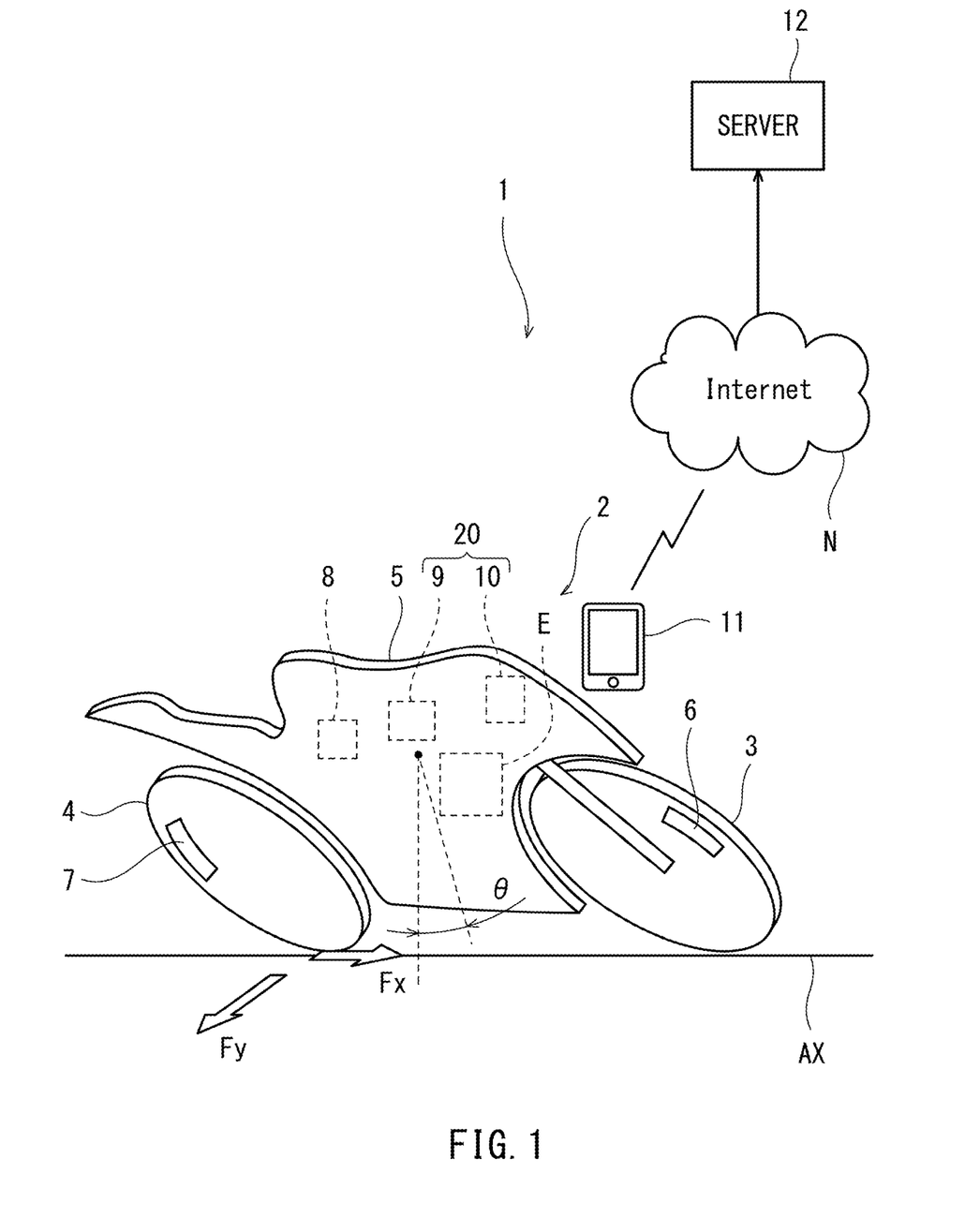
FIG. 1 is an overall view illustrating a travel route generation system according to an exemplary embodiment and a vehicle to which the travel route generation system is applied.

FIG. 1 is an overall view illustrating a travel route generation system 1 according to an exemplary embodiment and a vehicle to which the travel route generation system 1 is applied. The vehicle 2 to which the travel route generation system 1 is applied is preferably a lean vehicle (e.g., a motorcycle) whose vehicle body is tilted (leaned) in the roll direction during turning as illustrated in FIG. 1. The vehicle 2 may be a four-wheeled vehicle or bicycle.

The vehicle 2 is, for example, a motorcycle including a front wheel 3 (driven wheel), a rear wheel 4 (drive wheel), and a vehicle body 5 supported by the front and rear wheels 3 and 4. The vehicle 2 makes a turn in a state where the vehicle body 5 is tilted in the roll direction (left-right direction) about a front-rear axis AX passing through a ground contact point of the front wheel and a ground contact point of the rear wheel (this state is referred to as the "leaned state"). The angle of tilt of the vehicle body 5 about the front-rear axis AX with respect to the upright position of the vehicle body 5 is referred to as a "lean angle θ" (the lean angle θ is zero in the upright position). The vehicle 2 makes a turn while maintaining the leaned state by running with a tilt angle at which the entire traveling entity including the operator and the vehicle 2 is in balance with the centrifugal force.

The vehicle 2 includes a prime mover E for producing drive power for running of the vehicle 2. The prime mover E is, for example, an engine (internal combustion engine), an electric motor, or a combination of the engine and electric motor. The drive power produced by the prime mover E is applied to the rear wheel 4 through a power transmission mechanism. The vehicle 2 includes a hydraulic brake system for braking the front and rear wheels 3 and 4. The brake system includes a front brake unit 6 for braking the front wheel 3, a rear brake unit 7 for braking the rear wheel 4, and a brake control device 8 for controlling the front and rear brake units 6 and 7. The front and rear brake units 6 and 7 operate independently of each other and apply brake forces to the front and rear wheels 3 and 4, respectively. The brake forces are proportional to brake pressures.

The vehicle 2 includes a controller 9 (ECU). The controller 9 can control the drive power of the prime mover E. The controller 9 can control the brake control device 8 (ABS control). The controller 9 may control vehicle body behaviors (the suspensions and steering). For control of the vehicle 2, pieces of information (sensor information) detected by a plurality of sensors mounted on the vehicle body 5 are input to the controller 9. The sensors will be described later.

The vehicle 2 includes a communication device 10. The communication device 10 is communicatively connected to the controller 9. The communication device 10 includes a display that displays information (e.g., the vehicle speed and the prime mover rotational speed) to the operator based on information received from the controller 9. The communication device 10 includes a wireless communicator that performs wireless communication by a given short-range wireless communication protocol such as Bluetooth (registered trademark). The controller 9 and communication device 10 constitute a vehicle control system 20. The communication device 10 selects part of the information received from the controller 9 and other entities and periodically transmits the selected information to an external device through the wireless communicator.

The portable information terminal 11 accompanies the operator or vehicle 2. For example, the operator of the vehicle 2 carries the portable information terminal 11 (e.g., a smartphone) or places the portable information terminal 11 at a given location on the lean vehicle 2. The portable information terminal 11 is configured to communicate with the communication device 10 by a given short-range wireless communication protocol such as Bluetooth (registered trademark). The portable information terminal 11 is configured to communicate with a server 12 (computer) through a communication network N (e.g., the Internet).

The device for transmitting information from the lean vehicle 2 to the portable information terminal 11 is not limited to the communication device 10, and may be a meter device having a communication function. The controller 9 may consist of a single ECU or be constituted by a plurality of separate ECUs. The communication device 10 and the portable information terminal 11 may communicate with each other by wire. A prime mover control device or the brake control device may communicate with the portable information terminal 11 instead of the communication device 10. The vehicle information may be transmitted from the sensors or any other entities to the external device such as the portable information terminal 11 or server 12 through a wireless device without the mediation of the controller 9.

Figure 2:
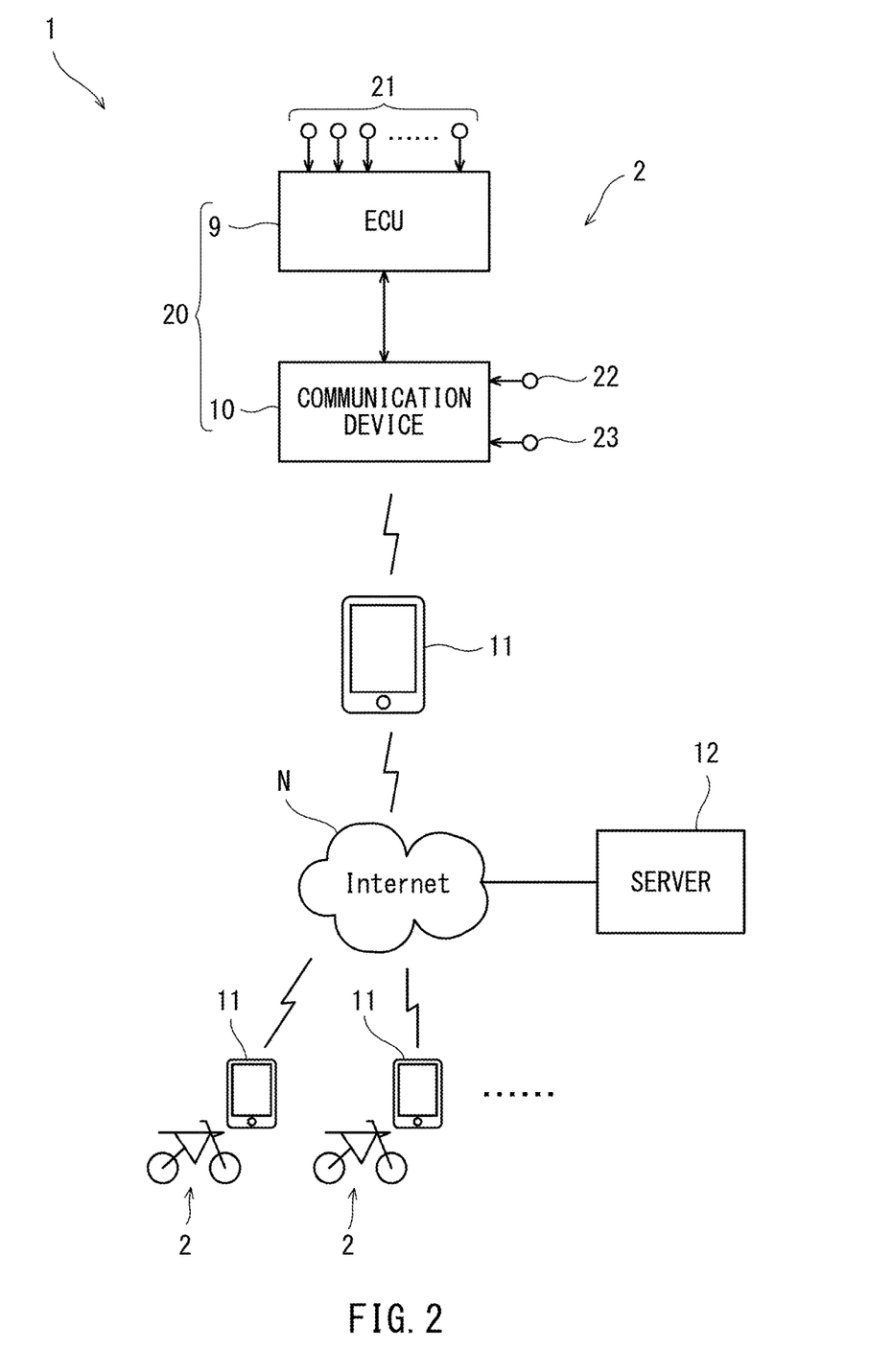
FIG. 2 is a schematic diagram illustrating an exemplary application of the travel route generation system of FIG. 1.

FIG. 2 is a schematic diagram illustrating an exemplary application of the travel route generation system 1 of FIG. 1. As illustrated in FIG. 2, a plurality of running state sensors 21, a satellite positioning sensor 22, and a user-operated device 23 are electrically connected to the vehicle control system 20. Specifically, the running state sensors 21 are connected to the controller 9, and the satellite positioning sensor 22 and user-operated device 23 are connected to the communication device 10.

The running state sensors 21 are mounted on the vehicle 2 and detect physical quantities representing the running state of the vehicle 2. The running state may include a vehicle state that changes over time during running of the vehicle. The running state sensors 21 are not limited to sensors for detecting continuous-valued parameters such as voltage, but may include a switch for detecting ON/OFF. The running state sensor information detected by the running state sensors 21 is input to the controller 9. The controller 9 periodically transmits the running state sensor information to the communication device 10.

To detect the running state, the running state sensors 21 may measure vehicle body motion-related physical quantities such as the location, position, and momentum of the vehicle. Alternatively, to detect the running state, the running state sensors 21 may measure the amount of operator's vehicle body operation influencing the vehicle body motion and the amount of control of actuators influencing the vehicle body motion. The actuators include, for example, an electronically-controlled throttle, a fuel injector, an ignition plug, and an ABS. Depending on the type of the vehicle, the actuators may include an electronically-controlled suspension, an electronically-controlled steering, a gear-shifting actuator, and a clutch actuator.

For example, the running state sensors 21 may include at least one of a vehicle speed sensor, a wheel rotational speed sensor, a prime mover rotational speed sensor, a brake pressure sensor, an accelerator operation amount sensor (or a throttle position sensor), an acceleration sensor, a gyro sensor (IMU), a lean angle sensor, a suspension stroke sensor, a gear position sensor, a clutch operation sensor, a steering angle sensor, and a satellite positioning sensor. That is, the running state sensor information detected by the running state sensors 21 may include the running speed of the vehicle 2, the rotational speed of at least one of the front and rear wheels 3 and 4, the rotational speed of the prime mover E, the brake pressure of at least one of the front and rear brake units 6 and 7, the amount of operator's accelerator operation (acceleration demand), the acceleration of the vehicle body 5 in a given direction (such as the up-down direction, front-rear direction, or left-right direction), the speed of rotational motion of the vehicle body 5 about a given axis (such as the roll or pitch axis), the lean angle, the gear position of the transmission, the engagement/disengagement of the clutch, the steering angle, and running location information.

The controller 9 performs given arithmetic and logical operations based on the running state sensor information and provides control commands to the various actuators such as the electric throttle device, fuel injector, ignition plug, and brake units 6 and 7, thereby controlling the drive power and brake forces. The control commands of the controller 9 and the various pieces of sensor information are transmitted also to the communication device 10.

The controller 9 calculates running state calculation information indicating the running state of the vehicle 2. The controller 9 periodically transmits the running state calculation information to the communication device 10. The running state calculation information may include, for example, a tire force acting on the tire of the front or rear wheel 3 or 4 from the road surface, a centrifugal force acting on the lean vehicle 2 during turning, the maximum vehicle speed during a period from the latest start of the vehicle 2 to the current time point, and the average vehicle speed during a period from the latest start of the vehicle 2 to the current time point. The running state calculation information need not be calculated by the controller 9, but may be calculated by the communication device 10, portable information terminal 11, or server 12.

The tire force may include a longitudinal tire force Fx (see FIG. 1) acting in a tire longitudinal direction (front-rear direction) and a lateral tire force Fy (see FIG. 1) acting in a tire lateral direction (left-right direction). The longitudinal tire force Fx can be calculated by a function the value of which increases with increasing prime mover rotational speed and decreases with increasing brake pressure. The lateral tire force Fy can be calculated by a function the value of which increases with increasing lateral acceleration and with increasing lean angle.

The longitudinal and lateral tire forces Fx and Fy can be determined also in another way. The tire forces may be calculated using known equations derived from motion equations defined based on the balance between different forces including a centrifugal force (see WO 2018/073912 A). The tire forces may be acquired based on information obtained through sensors that detect actual forces acting on the tires (see JP 2017-161395 A).

The centrifugal force can be calculated based on detection signals of a lateral acceleration sensor and a lean angle sensor. The positional relationship between the lateral acceleration sensor and vehicle body 5 is fixed; thus, once the vehicle body 5 enters the leaned state, the direction of detection by the lateral acceleration sensor is also tilted relative to the horizontal plane together with the vehicle body 5. As such, the centrifugal force can be calculated by determining a force as the product of the lateral acceleration detected by the lateral acceleration sensor and a mass and by determining a horizontal component of the force based on the lean angle. The mass may be the weight of the vehicle 2, and is preferably the total weight of the vehicle 2 and operator.

Alternatively, the centrifugal force may be calculated from the curvature of the running trajectory (curve trajectory) and vehicle speed data. Alternatively, the centrifugal force may be calculated based on the acceleration rates in the yaw and roll directions. Alternatively, as disclosed in JP 2017-65561 A, the centrifugal force may be determined as a function of the angle of tilt of the entire traveling entity including the vehicle and operator (traveling entity lean angle) in the vehicle width direction; namely, the centrifugal force may be determined as a force with which the entire traveling entity tilted in the vehicle width direction is in balance.

The controller 9 controls the prime mover E and/or brake control device 8 based on the running state sensor information received from the running state sensor 21. Upon determining that a given event (such as slip, wheel locking, or wheelie) has occurred based on the running state sensor information received from the running state sensor 21, the controller 9 carries out event suppression control (such as traction control, ABS control, or wheelie suppression control) for suppressing the event. The controller 9 transmits to the communication device 10 an event suppression control signal indicating that the event suppression control is being carried out. Information indicating that the event suppression control is being carried out is an example of running control information.

The satellite positioning sensor 22 receives vehicle location information from a positioning satellite. The satellite positioning sensor 22 may be mounted on the portable information terminal 11 instead of being mounted on the communication device 10. The satellite positioning sensor 22 may be mounted on the vehicle separately from the communication device 10 and electrically connected to the communication device 10. The vehicle location information may be acquired by calculating the total travel distance and the total travel direction with the aid of a vehicle speed sensor and a directional sensor instead of using the satellite positioning sensor 22.

The user-operated device 23 is a user interface on which the operator performs input operations. The user-operated device 23 can be used, for example, to select a desired one of running modes. The running modes may include, for example, a fuel-saving running mode, a high output running mode, and a cruise control running mode. In the case where the vehicle 2 is a hybrid vehicle, the running modes may include an engine running mode, an EV running mode, and an HEV running mode. The information of the running mode selected through the user-operated device 23 is mode selection information indicating the running mode of the vehicle 2.

The communication device 10 transmits vehicle state information and vehicle attribute information to the portable information terminal 11 by short-range wireless communication. The vehicle-related information includes at least one selected from the group consisting of the vehicle state information and the vehicle attribute information. The vehicle state information is information indicating the state of the vehicle 2 during running and includes at least one selected from the group consisting of the running state sensor information, the running state calculation information, and the running control information.

The vehicle attribute information is information related to the attributes of the vehicle 2, and includes vehicle identity information and vehicle classification information. The vehicle identity information includes vehicle identification information. The vehicle identification information includes information for discriminating the vehicle 2 from other vehicles 2, and is selected from, for example, a meter ID (meter product number information) stored in the communication device 10 and a controller ID (vehicle identification number, abbreviated as VIN) stored in the controller 9.

The communication device 10 retrieves the vehicle identification information from a memory of the communication device 10 or controller and wirelessly transmits the vehicle identification information to an external device. The vehicle identification information may include a serial number. For example, the vehicle identification information may include information indicating the manufacturer, the vehicle attributes, the manufacturing year, the manufacturing plant, and the serial number. The vehicle attributes include information indicating the vehicle type. The vehicle identification information includes at least information that allows identification of the type of the vehicle incorporating the controller 9 and communication device 10.

The vehicle classification information includes the vehicle type (e.g., "Naked", "Supersport", "American", "Motocrosser", and "Big scooter"), the displacement (e.g., displacement categories such as "Small", "Middle", and "Large" and the numerical range of the displacement), and the vehicle model (e.g., the model and model year), and the vehicle manufacturer. In the present embodiment, when transmitting the vehicle state information to the portable information terminal 11 together with the vehicle attribute information by short-range wireless communication, the communication device 10 transmits only the vehicle identity information as the vehicle attribute information.

The portable information terminal 11 is configured to communicate with the server 12 through the network N. The server 12 is disposed in a fixed installation distant from the vehicle 2. The server 12 can communicate with the portable information terminals 11 of the respective users of a large number of the vehicles 2 and accumulate various data received from the portable information terminals 11.

Figure 3:
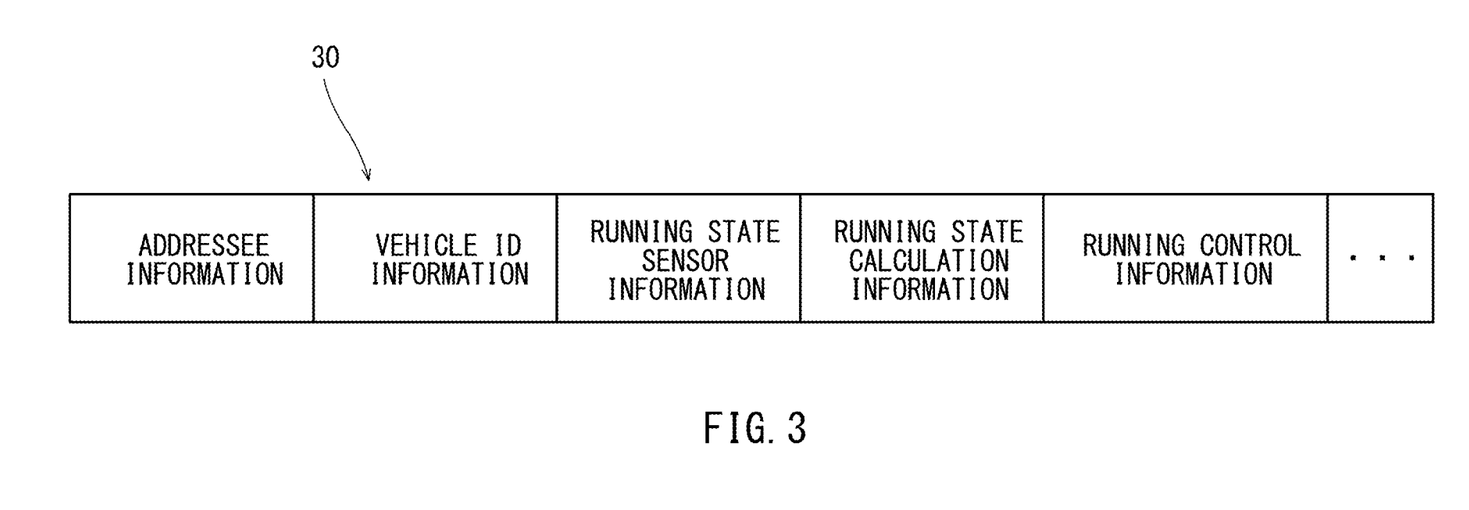
FIG. 3 illustrates the format of a signal transmitted from a communication device of FIG. 2.

FIG. 3 illustrates the format of a signal 30 transmitted from the communication device 10 of FIG. 2 to the portable information terminal 11. As illustrated in FIG. 3, the signal 30 transmitted from the communication device 10 includes addressee information, the vehicle identification information, the running state sensor information, the running state calculation information, and the running control information. The signal 30 may include the vehicle classification information. The addressee information is identification information indicating the portable information terminal 11 to which the signal is transmitted. For example, the addressee information is acquired by the communication device 10 through pairing between the communication device 10 and the portable information terminal 11. The signal 30 is periodically transmitted from the communication device 10 to the portable information terminal 11. The transmission timing may be adjusted. The amount of information carried by the signal 30 may be reduced as appropriate.

Figure 4:
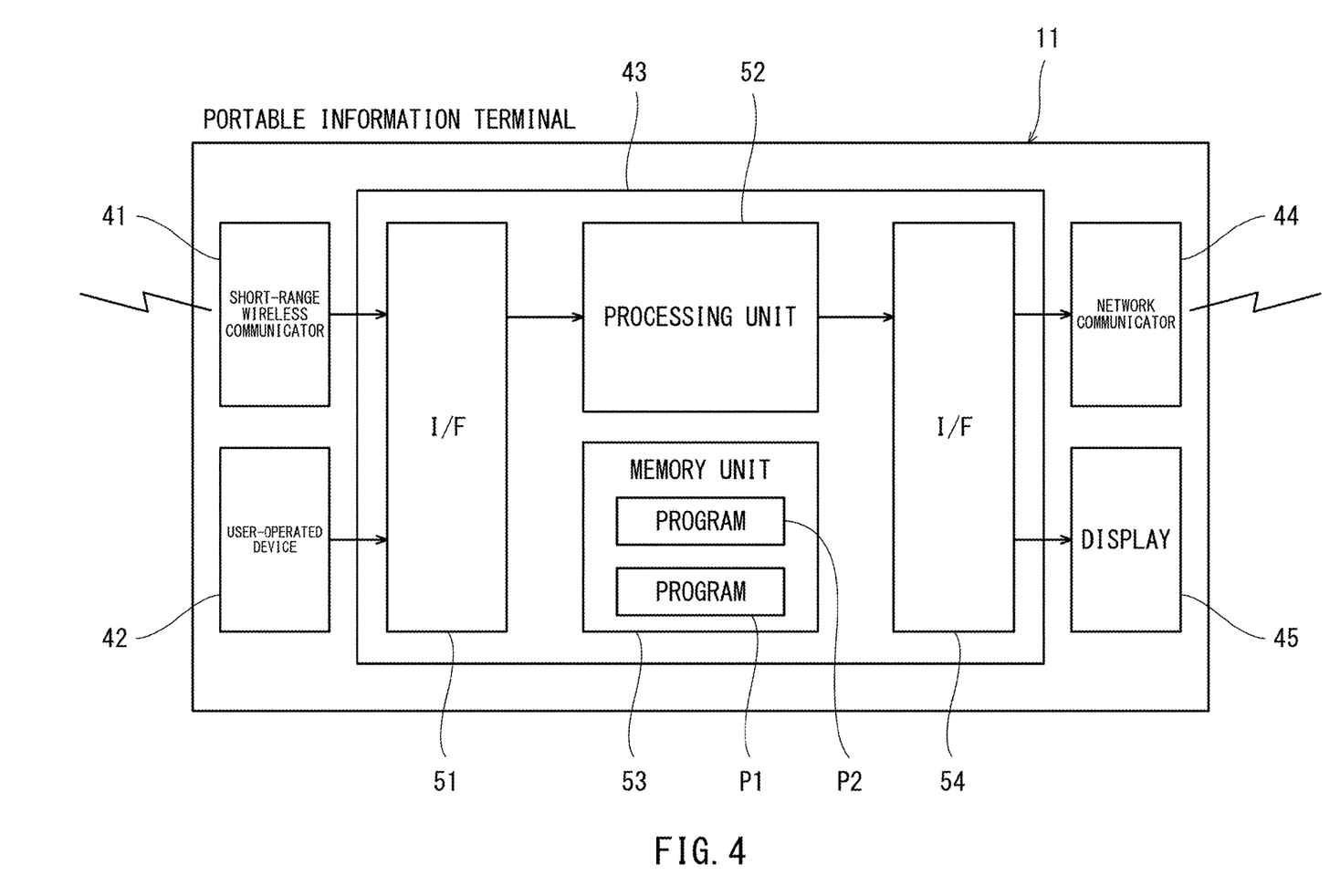
FIG. 4 is a block diagram of a portable information terminal of FIG. 2.

FIG. 4 is a block diagram of the portable information terminal 11 of FIG. 2. As illustrated in FIG. 4, the portable information terminal 11 includes a short-range wireless communicator 41, a user-operated device 42, a control module 43, a network communicator 44, and a display 45. The short-range wireless communicator 41 is capable of communicating with the communication device 10 by short-range wireless communication and receives the signal 30 (see FIG. 3) from the communication device 10. The user-operated device 42 receives input operations from the user of the portable information terminal 11. The user-operated device 42 is, for example, a touch panel.

The control module 43 includes a processor, a main memory (RAM), a storage, and an I/O interface as hardware components. The network communicator 44 is configured to communicate with the network N via a network line (such as a public data communication network or wireless LAN). The display 45 is a display device (such as a touch panel) that displays images.

The control module 43 includes an input unit 51, a processing unit 52, a memory unit 53, and an output unit 54 as functional components. The input and output units 51 are implemented by the I/O interface. The processing unit 52 is implemented by the processor. The memory unit 53 is implemented by the main memory and storage. The processing unit 52 performs arithmetic and logical operations using the main memory and based on programs stored in the storage.

The memory unit 53 prestores an information transmission program P1 and a travel route search program P2. The programs P1 and P2 may be downloaded into the portable information terminal 11 through the network N in response to an operation performed on the user-operated device 42 by the user, and the downloaded programs P1 and P2 may be stored in the memory unit 53.

The processing unit 52 transmits the vehicle-related information to the server 12 according to the information transmission program P1 and through the network N. Specifically, the short-range wireless communicator 41 receives the signal 30 (see FIG. 3) periodically transmitted from the communication device 10 during running of the vehicle 2. Among the pieces of information contained in the signal 30, the vehicle state information (including the running state sensor information, running state calculation information, and running state control information) is input to the input unit 51 in association with the vehicle identification information. Upon input of the vehicle state information and vehicle identification information to the input unit 51, the processing unit 52 transmits them to the server 12 through the network N.

The processing unit 52 transmits operator attribute information to the server 12 according to the information transmission program P1 and through the network N. Specifically, the information transmission program P1 generates the operator attribute information based on information related to the operator and input by the operator themselves through the user-operated device 42. The operator attribute information includes operator identification information, the age of the operator, the occupation of the operator, and the sex of the operator. The processing unit 52 transmits the generated operator attribute information to the server 12 in association with the vehicle identification information and through the network N. The travel route search program P2 will be described later.

Figure 5:
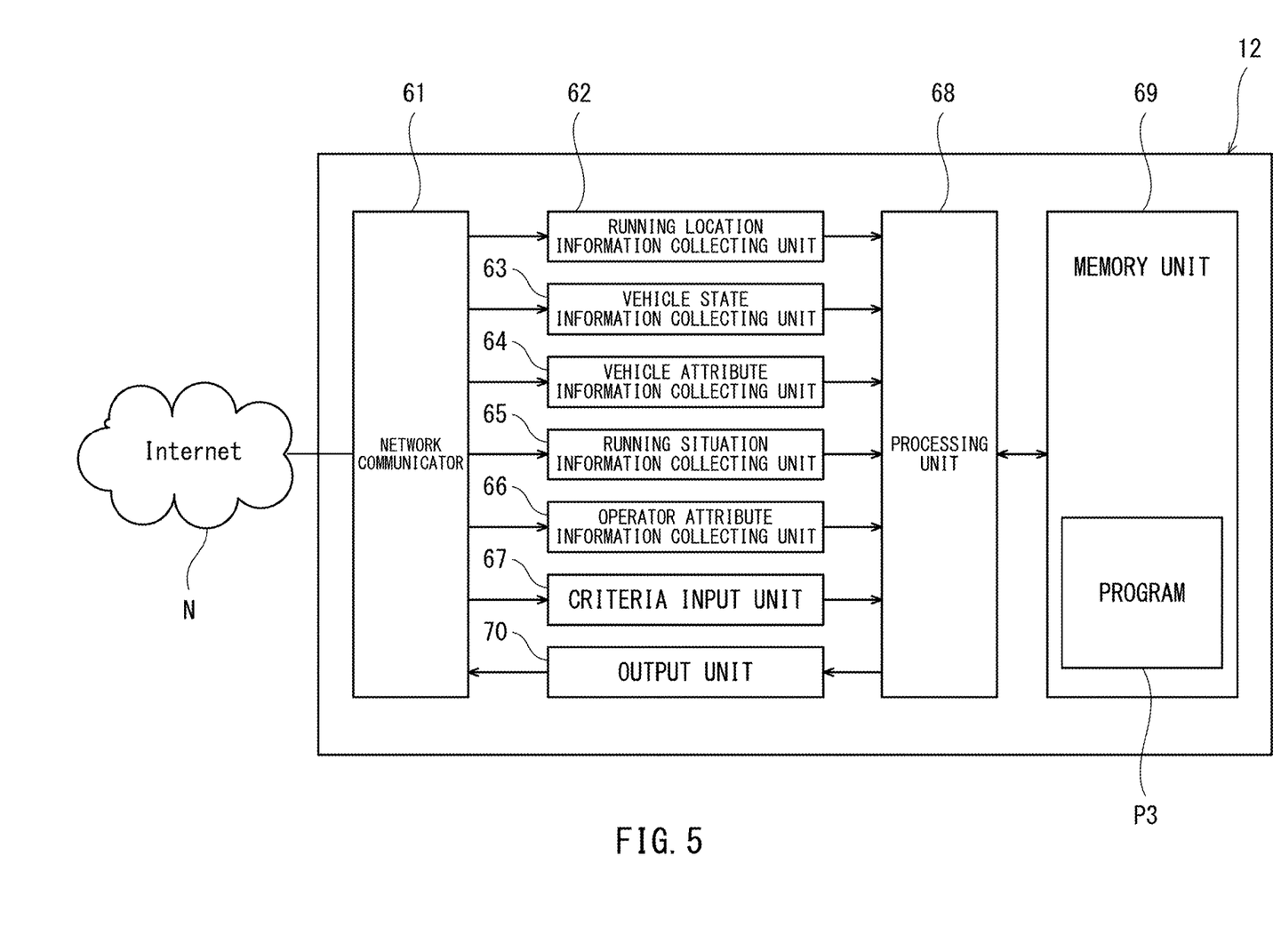
FIG. 5 is a block diagram of a server of FIG. 2.

FIG. 5 is a block diagram of the server 12 of FIG. 2. As illustrated in FIG. 5, the server 12 includes a network communicator 61, a running location information collecting unit 62 (first collector), a vehicle state information collecting unit 63 (second collector), a vehicle attribute information collecting unit 64 (second collector), a running situation information collecting unit 65 (third collector), an operator attribute information collecting unit 66 (fourth collector), a criteria input unit 67, a processing unit 68, a memory unit 69, and an output unit 70 as functional components.

The server 12 includes a processor, a main memory (RAM), a storage, and an I/O interface as hardware components. The network communicator 61 is configured to communicate with the network N via a network line (such as a public data communication network or wireless LAN).

The running location information collecting unit 62, vehicle state information collecting unit 63, vehicle attribute information collecting unit 64, running situation information collecting unit 65, operator attribute information collecting unit 66, criteria input unit 67, and processing unit 68 are implemented through arithmetic and logical operations performed using the main memory and based on programs stored in the storage. The memory unit 69 is implemented by the storage. The output unit 70 is implemented by the processor and I/O interface.

The memory unit 69 prestores a travel route generation program P3. The running location information collecting unit 62, vehicle state information collecting unit 63, vehicle attribute information collecting unit 64, running situation information collecting unit 65, operator attribute information collecting unit 66, criteria input unit 67, and processing unit 68 perform information processing according to the travel route generation program P3. The travel route generation program P3 causes the server 12 to carry out an information collection process and a recommended route generation process. The information collection process and recommended route generation process will be described later.

The running location information collecting unit 62 collects the running location information received from the portable information terminals 11 through the network N. The vehicle state information collecting unit 63 collects the vehicle state information received from the portable information terminals 11 through the network N. The vehicle attribute information collecting unit 64 collects the vehicle attribute information received from the portable information terminals 11 through the network N. The running situation information collecting unit 65 collects information indicating the environmental parameters (e.g., the weather and road surface condition) of the locations indicated by the running location information from an external environment information provider through the network N. The running situation information collecting unit 65 extracts the dates, the clock times, the days of week, etc. from information possessed by the server 12 based on when the signals 30 were received from the portable information terminals 11 through the network N.

The operator attribute information collecting unit 66 collects the operator attribute information received from the portable information terminal 11 through the network N. The operator attribute information collecting unit 66 obtains the operator attribute information based on the pieces of information collected by the running location information collecting unit 62, vehicle state information collecting unit 63, vehicle attribute information collecting unit 64, and running situation information collecting unit 65. The operator attribute information includes at least one selected from the group consisting of driving skill information indicating the driving skills of individual operators and preferred running route type information indicating the types of running routes preferred by the operators. The driving skill information includes at least one selected from the group consisting of a driving experience parameter (such as the total running distance, the total running time, or the length of the vehicle possession period) and a position in lap time ranking. The preferred running route type information includes at least one selected from the group consisting of the time-averaged level of vertical vibration of the vehicle body, the tire force (average and maximum values), the running speed (average and maximum values), the lean angle (average and maximum values), and the frequency of vehicle turns.

The criteria input unit 67 collects screening criteria received from the portable information terminal 11 through the network N. The screening criteria may be preset in the memory unit 69. The processing unit 68 generates at least one recommended running route based on the running location information, vehicle state information, vehicle attribute information, running situation information, operator attribute information, and screening criteria. The output unit 70 transmits the recommended running route generated by the processing unit 52 to the portable information terminal 11 through the network N.

In the information collection process performed according to the travel route generation program P3, the processing unit 68 places the pieces of information collected by the collectors 62 to 66 into the memory unit 69. The memory unit 69 stores the vehicle state information, vehicle attribute information, running situation information, and operator attribute information in association with the running location information. The processing unit 68 allocates the vehicle-related information, running situation information, and operator attribute information to different evaluation locations each consisting of a road location or road segment based on the running location information of each vehicle 2 which is stored in the memory unit 69. Thus, the vehicle-related information, running situation information, and operator attribute information are accumulated in the memory unit 69 for each evaluation location. This makes it possible to quantify the trends of the vehicle state information, vehicle attribute information, running situation information, and operator attribute information for each evaluation location.

Figure 6:
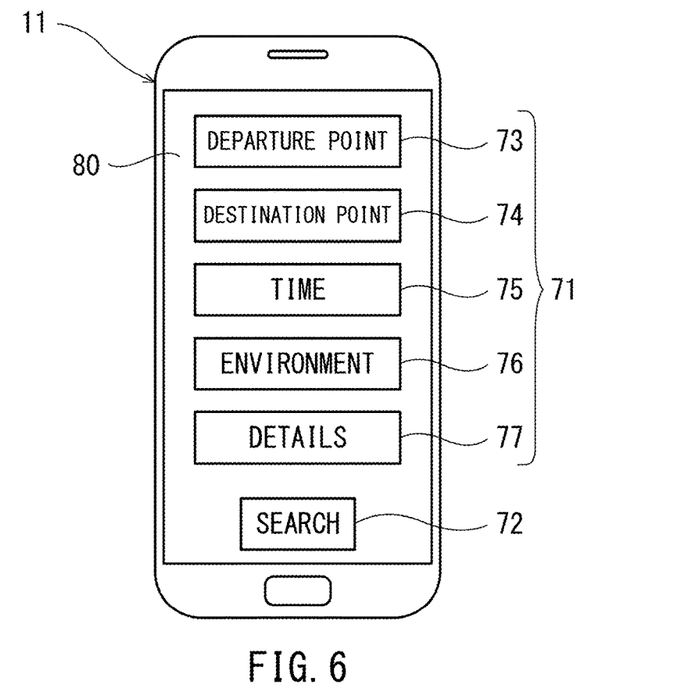
FIG. 6 illustrates a search screen of the portable information terminal of FIG. 2.

The following describes the recommended route generation process performed according to the travel route generation program P3. The recommended route generation process starts in response to a search request from the portable information terminal 11. The portable information terminal 11 displays a search screen 80 as shown in FIG. 6 once the user activates the travel route search program P2. On the search screen 80 are displayed criteria input portions 71 and a search request portion 72. The criteria input portions 71 include, for example, a departure point input portion 73, a destination point input portion 74, a time input portion 75, an environment input portion 76, and a details input portion 77.

The departure point input portion 73 and the destination point input portion 74 are selected by the user to input departure and destination points between which the user wants to travel. The time input portion 75 is selected by the user to input a departure time at which the user wants to start the travel and/or arrival time until which the user wants to end the travel. The environment input portion 76 is selected by the user to input an environment in which the user wishes to travel (the criteria that can be input include the date, the day of week, the weather, and the road surface condition). The details input portion 77 is selected to input other detailed criteria.

The detailed criteria include, for example, a criterion for selecting a particular type of travel route from a plurality of travel routes having different characteristics. The travel routes include an advanced route, a beginner route, a similar vehicles running route, a similar operators running route, a popular route, an unpopular route, and routes having a combination of characteristics of the different types of routes. Each type of route will be described in detail later.

Once the user selects the search request portion 72 after inputting the criteria to the criteria input portions 71, the criteria input to the criteria input portions 71 are transmitted as the screening criteria to the server 12 through the network N. The transmitted screening criteria are input to the criteria input unit 67 of the server 12. The processing unit 68 performs the recommended route generation process based on the screening criteria input to the criteria input unit 67 and according to the travel route generation program P3. That is, the processing unit 68 determines a recommended running route based on all of the criteria input to the departure point input portion 73, destination point input portion 74, time input portion 75, environment input portion 76, and details input portion 77.

The processing unit 68 determines the recommended running route by a known Dijkstra's algorithm. The Dijkstra's algorithm finds a shortest route from the departure point to the destination point based on the lengths of line segments representing many roads connecting the departure and destination points. In the present embodiment, the lengths of the line segments (road segments) in the Dijkstra's algorithm are weighted according to matching scores indicating the degrees of match of the line segments to the screening criteria. The likelihood that the algorithm selects a line segment with a high matching score as the shortest route is increased by performing the weighting in such a manner that the line segment length decreases with increasing matching score. A high matching score is assigned to a line segment matched well to the travel route characteristics specified by the user in the screening criteria.

The calculation of a matching score for each line segment is performed using the information (at least one selected from the group consisting of the vehicle-related information, running situation information, and operator attribute information) accumulated in the memory unit 69 for each evaluation location. Each line segment is evaluated using the accumulated information as to the evaluation location contained in the line segment. The accumulated information used for the matching score calculation is filtered to exclude information mismatched to the running situation information included in the screening criteria.

For example, in the case where the advanced route is selected in the screening criteria, an evaluation location where aggressive running is often attempted is chosen based on the vehicle state information included in the accumulated information, and a high matching score is assigned to a line segment corresponding to the evaluation location. In the case where the beginner route is selected in the screening criteria, an evaluation location where aggressive running is rarely attempted is chosen based on the vehicle state information included in the accumulated information, and a high matching score is assigned to a line segment corresponding to the evaluation location.

In the case where the similar vehicles running route is selected in the screening criteria, an evaluation location often traveled by vehicles having attributes similar to those of the user's own vehicle is chosen based on the vehicle attribute information included in the accumulated information, and a high matching score is assigned to a line segment corresponding to the evaluation location. In the case where the similar operators running route is selected in the screening criteria, an evaluation location often traveled by operators having attributes similar to those of the user is chosen based on the operator attribute information included in the accumulated information, and a high matching score is assigned to a line segment corresponding to the evaluation location.

In the case where the popular route is selected in the screening criteria, an evaluation location often traveled among all vehicles is chosen based on the running location information included in the accumulated information, and a high matching score is assigned to a line segment corresponding to the evaluation location. In the case where the unpopular route is selected in the screening criteria, an evaluation location little traveled among all vehicles is chosen based on the running location information included in the accumulated information, and a high matching score is assigned to a line segment corresponding to the evaluation location.

The processing unit 68 uses the Dijkstra's algorithm described above to determine the shortest route from the departure point to the destination point based on the line segment lengths weighted according to the matching scores indicating the degrees of match of the line segments to the screening criteria. The processing unit 68 generates the determined shortest route as the recommended running route (this shortest route can be different from the actual shortest route because of the weighting performed according to the matching scores). The output unit 70 transmits the recommended running route generated to the portable information terminal 11 through the network N.

Figure 7:
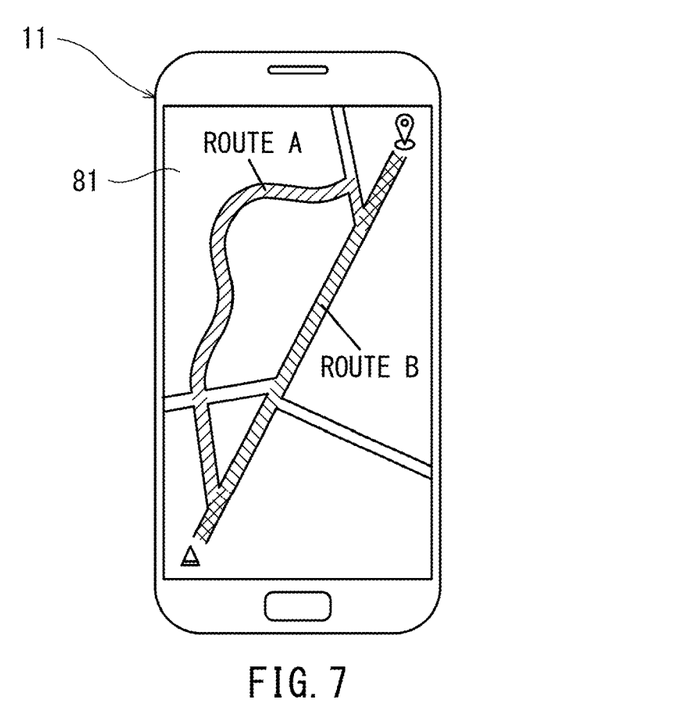
FIG. 7 illustrates a map image displayed on the portable information terminal of FIG. 2 to present a navigation recommended running route.

As illustrated in FIG. 7, the portable information terminal 11 having received the recommended running route from the server 12 displays the recommended running route on a map image 81 according to the travel route search program P2. One recommended running route or two or more recommended running routes may be displayed on the map image. For example, a route A best matched to the screening criteria and a route B that is the second-best matched route may be displayed as the recommended running routes.

Figure 8:
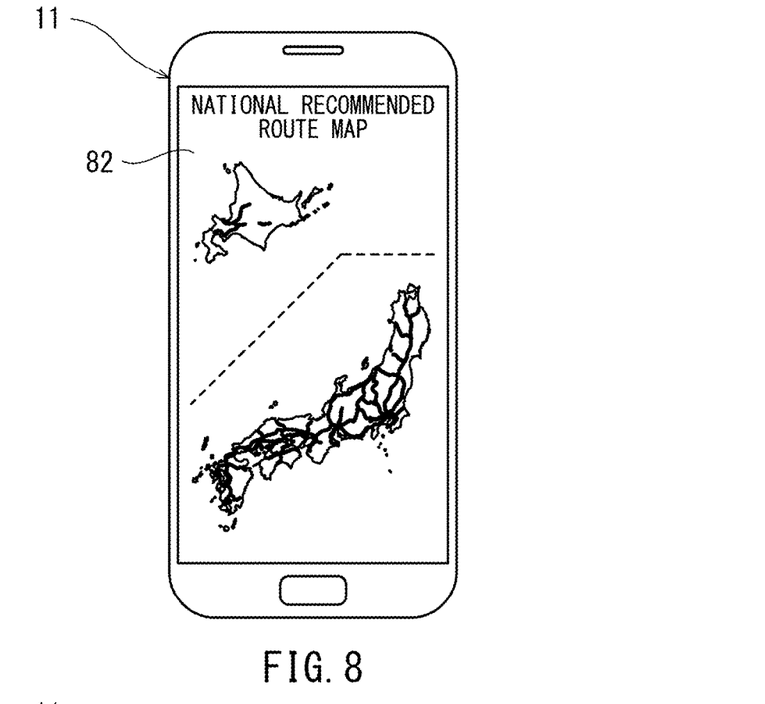
FIG. 8 illustrates a map image displayed on the portable information terminal of FIG. 2 to present a national recommended route map.
Figure 9:
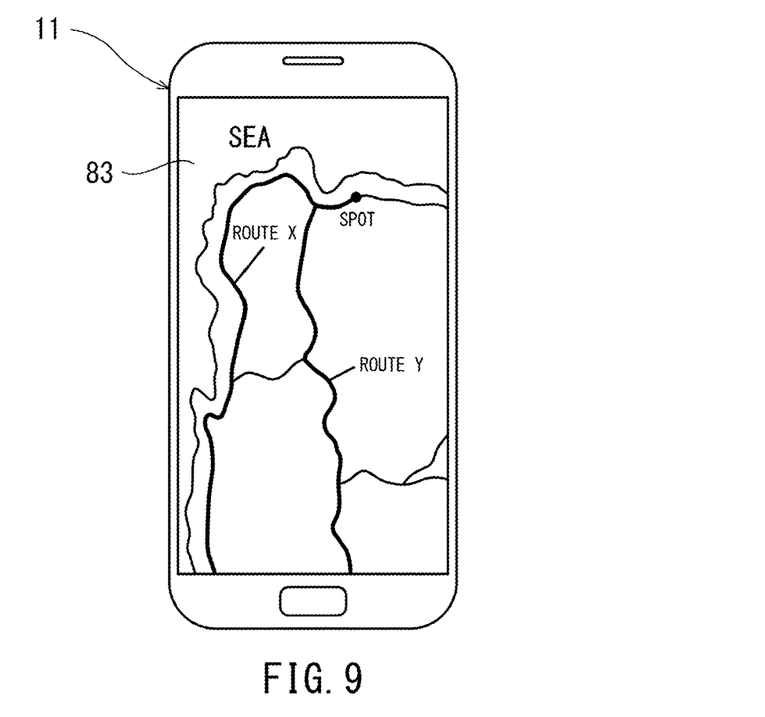
FIG. 9 is an enlarged map image showing a part of the national recommended route map of FIG. 8 in an enlarged manner.

The screening criteria input by the user need not include the departure and destination points. In this case, as illustrated in FIG. 8, the portable information terminal 11 may, based on the screening criteria, display a map image 82 presenting a national recommended route map. As illustrated in FIG. 9, the portable information terminal 11 may display an enlarged map image 83 showing a part of the national recommended route map in an enlarged manner, and a plurality of recommended running routes (routes X and Y) having different travel route characteristics may be presented on the enlarged map image 83.

In the configuration described above, the recommended running route is generated according to the screening criteria including a criterion regarding the vehicle-related information and based on the relationship between the vehicle-related information collected during past travels of a plurality of vehicles 2 and the running locations through which the vehicles 2 ran in the past travels. This can help individual users enjoy traveling in accordance with their preferences which may vary from situation to situation.

Since the vehicle-related information includes the vehicle state information indicating the vehicle state during running, the recommended running route can be provided in accordance with the user preferences regarding the vehicle state during running (e.g., the running state sensor information, running state calculation information, and running control information). Since the vehicle state information includes at least one of the vehicle speed, the vehicle acceleration, the tire force, and the lean angle, the recommended running route can be provided in accordance with the user preferences regarding vehicle running. Since the vehicle-related information includes the vehicle classification information related to the vehicle classification, the recommended running route can be provided in accordance with the user preferences regarding the vehicle classification (e.g., the vehicle type, the displacement, and the vehicle manufacturer).

Since the screening criteria include a criterion regarding the running situation information, travel routes can be recommended to users based on the running situation information, and travel support can be provided in accordance with diverse preferences of the users. Since the screening criteria include a criterion regarding the operator attribute information (e.g., the age, the driving skill, the occupation, the sex, the type of preferred running route), travel routes can be recommended to users based on the operator attribute information, and travel support can be provided in accordance with diverse preferences of the users.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known hardware which is programmed or configured to carry out the recited functionality. When the hardware is a processor which may be considered a type of circuitry, the circuitry, means, or units are a combination of hardware and software, the software being used to configure the hardware and/or processor.

The above embodiments have been described to illustrate the technology disclosed in the present application. The technology of the present disclosure is not limited to the above embodiments, and is applicable also to embodiments obtained by making appropriate modifications, replacements, additions, and/or omissions to the above embodiments. The elements described in the above embodiments may be combined into other embodiments. For example, one or more elements or a method in one embodiment may be used in another embodiment. One or more elements in an embodiment may be arbitrarily extracted separately from the other elements in the embodiment. For the purpose of illustrating the technology, the elements disclosed in the attached drawings and the detailed description include not only elements essential for problem solution but also elements inessential for problem solution.

What is claimed is:

1. A travel route generation system comprising:
    a server configured to:
        collect running location information indicating running locations through which a plurality of lean vehicles have run, the lean vehicles being tilted in a roll direction during turning;
        collect vehicle-related information related to the plurality of lean vehicles, wherein the vehicle-related information includes vehicle state information indicating states of the lean vehicles during running, the vehicle-related information including at least one of a total tire force acting on a tire of the lean vehicle, a centrifugal force acting on the lean vehicle, a posture of the lean vehicle, a lean angle of the lean vehicle, or a speed of rotational motion of the lean vehicle about a roll or pitch axis with respect to the lean vehicles, wherein the vehicle-related information is obtained while the lean vehicles are turning;
        store the vehicle-related information in memory in association with the running location information;
        receive inputs of screening criteria of a lean vehicle of the plurality of lean vehicles, the screening criteria including a criterion regarding the vehicle-related information of the lean vehicle;
        generate a recommended running route of the lean vehicle according to the screening criteria and based on the running location information and the vehicle-related information which are stored in the memory, wherein generating the recommended running route includes:
            computing a weighted graph in which respective weights associated with a plurality of road segments are computed based at least in part on the screening criteria, the running location information, and the vehicle-related information; and
            executing a pathfinding algorithm over the weighted graph to determine the recommended running route; and
        via an input-output interface, output the recommended running route for display on a portable information device or a meter device; and
    wherein, for each of the plurality of lean vehicles, a vehicle controller controls either a prime mover and/or brake control device based on running state sensor information received from a running state sensor of the respective vehicle, to prevent one of a wheel slip, wheel locking, and wheelie event, and the running state sensor information is further included in the vehicle state information.

2. The travel route generation system according to claim 1, wherein the vehicle state information includes at least one selected from the group consisting of running state calculation information and running control information.

3. The travel route generation system according to claim 1, wherein the vehicle-related information includes vehicle attribute information related to attributes of the lean vehicles.

4. The travel route generation system according to claim 1, wherein the server is further configured to collect running situation information including at least one selected from the group consisting of date, clock time, day of week, and environment,
    wherein the memory stores the running situation information in association with the running location information, and
    wherein the screening criteria include a criterion regarding the running situation information.

5. The travel route generation system according to claim 1, wherein the server is further configured to collect operator attribute information related to respective operators of the lean vehicles,
    wherein the memory stores the operator attribute information in association with the running location information, and
    wherein the screening criteria include a criterion regarding the operator attribute information.

6. The travel route generation system according to claim 1,
    wherein the vehicle-related information includes pieces of vehicle attribute information related respectively to the lean vehicles, each piece of vehicle attribute information being stored in association with the running location information related to a corresponding one of the lean vehicles, and
    wherein the screening criteria include a criterion regarding the vehicle attribute information.

7. A travel route generation method comprising:
    collecting running location information indicating running locations through which a plurality of lean vehicles have run, the lean vehicles being tilted in a roll direction during turning;
    collecting vehicle-related information related to the plurality of lean vehicles, wherein the vehicle-related information includes vehicle state information indicating states of the lean vehicles during running, the vehicle-related information including at least one of a total tire force acting on a tire of the lean vehicle, a centrifugal force acting on the lean vehicle, a posture of the lean vehicle, a lean angle of the lean vehicle, or a speed of rotational motion of the lean vehicle about a roll or pitch axis with respect to the lean vehicles, wherein the vehicle-related information is obtained while the lean vehicles are turning;

storing the vehicle-related information in memory in association with the running location information;

receiving inputs of screening criteria of a lean vehicle of the plurality of lean vehicles, the screening criteria including a criterion regarding the vehicle-related information of the lean vehicle;

generating a recommended running route of the lean vehicle according to the screening criteria and based on the running location information and the vehicle-related information, wherein generating the recommended running route includes:

computing a weighted graph in which respective weights associated with a plurality of road segments are computed based at least in part on the screening criteria, the running location information, and the vehicle-related information; and executing a pathfinding algorithm over the weighted graph to determine the recommended running route; and via an input-output interface, outputting the recommended running route for display on a portable information device or a meter device; and wherein, for each of the plurality of lean vehicles, a vehicle controller controls either a prime mover and/or brake control device based on running state sensor information received from a running state sensor of the respective vehicle, to prevent one of a wheel slip, wheel locking, and wheelie event, and the running state sensor information is further included in the vehicle state information.

8. A travel route generation system comprising:

a server configured to:
collect running location information indicating running locations through which a plurality of lean vehicles have run, the lean vehicles being tilted in a roll direction during turning;

collect vehicle-related information related to the plurality of lean vehicles, wherein the vehicle-related information includes one or more vehicle types and further includes vehicle state information indicating states of the lean vehicles during running;

store the vehicle-related information in memory in association with the running location information;

receive inputs of screening criteria of a lean vehicle of the plurality of lean vehicles, the screening criteria including:
a criterion regarding the one or more vehicle types indicated in the vehicle-related information; and
frequency of travel by the lean vehicles at different evaluation locations each including a road location or road segment under a selected condition;

generate a recommended running route of the lean vehicle according to the screening criteria and based on the running location information, the vehicle-related information, and the frequency of travel which are stored in the memory, wherein generating the recommended running route includes:
computing a weighted graph in which respective weights associated with a plurality of the road segments are computed based at least in part on the screening criteria, the running location information, and the vehicle-related information; and executing a pathfinding algorithm over the weighted graph to determine the recommended running route; and via an input-output interface, output the recommended running route for display on a portable information device or a meter device; and wherein, for each of the plurality of lean vehicles, a vehicle controller controls either a prime mover and/or brake control device based on running state sensor information received from a running state sensor of the respective vehicle, to prevent one of a wheel slip, wheel locking, and wheelie event, and the running state sensor information is further included in the vehicle state information.

9. The travel route generation system according to claim 1, wherein the total tire force includes a longitudinal tire force acting in a tire longitudinal direction and a lateral tire force acting in a tire lateral direction.

10. The travel route generation system according to claim 9, wherein:
the longitudinal tire force is calculated as a first function that increases with increasing prime mover rotational speed and decreases with increasing brake pressure; and
the lateral tire force is calculated as a second function that increases with increasing lateral acceleration and with increasing lean angle.

11. The travel route generation method according to claim 7, wherein the total tire force includes a longitudinal tire force acting in a tire longitudinal direction and a lateral tire force acting in a tire lateral direction.

12. The travel route generation method according to claim 11, wherein:
the longitudinal tire force is calculated as a first function that increases with increasing prime mover rotational speed and decreases with increasing brake pressure; and
the lateral tire force is calculated as a second function that increases with increasing lateral acceleration and with increasing lean angle.

13. The travel route generation system according to claim 3, wherein, when a predetermined similar vehicle condition is selected in the screening criteria, an evaluation location route with a higher frequency of vehicles with similar attributes from the vehicle attribute information is more likely to be generated as the recommended running route.

14. The travel route generation system according to claim 1, wherein:
the server is further configured to collect operator attribute information related to respective operators of the lean vehicles, the operator attribute information including types of running routes preferred by the operators;
the memory stores the operator attribute information in association with the running location information; and
the screening criteria include a criterion regarding the operator attribute information.

15. A travel route generation method comprising:
collecting running location information indicating running locations through which a plurality of lean vehicles have run, the lean vehicles being tilted in a roll direction during turning;

collecting vehicle-related information related to the plurality of lean vehicles, wherein the vehicle-related information includes vehicle state information indicating states of the lean vehicles during running, the vehicle-related information including at least one of a total tire force acting on a tire of the lean vehicle, a centrifugal force acting on the lean vehicle, a posture of the lean vehicle, a lean angle of the lean vehicle, or a speed of rotational motion of the lean vehicle about a roll or pitch axis with respect to the lean vehicles, wherein the vehicle-related information is obtained while the lean vehicles are turning;

storing the vehicle-related information in memory in association with the running location information;

receiving inputs of screening criteria of a lean vehicle of the plurality of lean vehicles, the screening including:
  a criterion regarding the vehicle-related information of the lean vehicle; and
  frequency of travel by the lean vehicles at different evaluation locations each including a road location or road segment under a selected condition;

generating a recommended running route of the lean vehicle according to the screening criteria and based on the running location information, the vehicle-related information, and the frequency of travel, wherein generating the recommended running route includes:
  computing a weighted graph in which respective weights associated with a plurality of road segments are computed based at least in part on the screening criteria, the running location information, and the vehicle-related information; and
  executing a pathfinding algorithm over the weighted graph to determine the recommended running route; and via an input-output interface, outputting the recommended running route for display on a portable information device or a meter device, wherein the vehicle-related information includes vehicle type information related to types of the lean vehicles;

in outputting the recommended running route, when a predetermined similar vehicle condition is selected in the screening criteria, an evaluation location route with a higher frequency of lean vehicles with similar type from the vehicle type information is more likely to be generated as the recommended running route; and for each of the plurality of lean vehicles, a vehicle controller controls either a prime mover and/or brake control device based on running state sensor information received from a running state sensor of the respective vehicle, to prevent one of a wheel slip, wheel locking, and wheelie event, and the running state sensor information is further included in the vehicle state information.

* * * * *